(12) United States Patent
Chesnutt et al.

(10) Patent No.: US 8,195,129 B2
(45) Date of Patent: *Jun. 5, 2012

(54) AUTHENTICATING A SHORT MESSAGE SERVICE (SMS) MESSAGE

(75) Inventors: Elizabeth Chesnutt, Troy, MI (US); Ki Hak Yi, Windsor (CA); Anthony J. Sumcad, Southfield, MI (US); Kevin R. Krause, Plymouth, MI (US)

(73) Assignee: General Motors LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/162,196

(22) Filed: Jun. 16, 2011

(65) Prior Publication Data

US 2011/0244830 A1  Oct. 6, 2011

Related U.S. Application Data

(63) Continuation of application No. 11/837,775, filed on Aug. 13, 2007, now Pat. No. 7,970,381.

(51) Int. Cl.
*H04M 1/66* (2006.01)

(52) U.S. Cl. ..... 455/411; 455/410; 455/466; 455/569.1; 455/575.2

(58) Field of Classification Search .................. 455/466, 455/410–411, 418–420, 569.1–569.2, 575.9
See application file for complete search history.

(56) References Cited

U.S. PATENT DOCUMENTS

| | | | | |
|---|---|---|---|---|
| 6,647,270 | B1 * | 11/2003 | Himmelstein | 455/456.1 |
| 7,051,365 | B1 * | 5/2006 | Bellovin | 726/11 |
| 7,076,657 | B2 * | 7/2006 | Koukoulidis et al. | 713/171 |
| 7,586,888 | B2 * | 9/2009 | Wang | 370/338 |
| 7,634,280 | B2 * | 12/2009 | Modeo | 455/466 |
| 7,693,797 | B2 * | 4/2010 | Ekberg | 705/67 |
| 7,773,754 | B2 * | 8/2010 | Buer et al. | 380/277 |
| 7,970,381 | B2 * | 6/2011 | Chesnutt et al. | 455/411 |
| 2003/0032409 | A1 * | 2/2003 | Hutcheson et al. | 455/414 |
| 2008/0310634 | A1 * | 12/2008 | Pavlovic | 380/270 |
| 2009/0013356 | A1 * | 1/2009 | Doerr et al. | 725/62 |
| 2009/0193265 | A1 * | 7/2009 | Andersson et al. | 713/189 |

FOREIGN PATENT DOCUMENTS

| | | |
|---|---|---|
| EP | 1513311 | 3/2005 |
| GB | 2415574 | 12/2005 |

* cited by examiner

*Primary Examiner* — Sharad Rampuria
(74) *Attorney, Agent, or Firm* — Anthony Luke Simon; Reising Ethington P.C.

(57) ABSTRACT

A vehicle telematics unit or other electronic hardware in a vehicle authenticates an incoming SMS message and provides additional security features above and beyond those inherent to the SMS protocol. A call center uses a mathematical function to derive a security code, and then sends an SMS message to the vehicle. The telematics unit can utilize the transmitted information to authenticate the sender of the SMS message and/or its contents. One group of suitable mathematical functions utilizes keyed-hash message authentication codes (HMACs).

14 Claims, 3 Drawing Sheets

AUTHENTICATING A SHORT MESSAGE SERVICE (SMS) MESSAGE

CROSS-REFERENCE TO RELATED APPLICATION

This application is a continuation of U.S. Ser. No. 11/837,775 filed Aug. 13, 2007, now U.S. Pat. No. 7,970,381. The complete contents of this prior application are hereby incorporated by reference.

TECHNICAL FIELD

The present invention generally relates to telematics unit used on vehicles and, more particularly, to authentication techniques that can be used by vehicle telematics units to verify the sender and/or contents of an SMS message before displaying it in the vehicle.

BACKGROUND

Numerous types of wireless communication devices are used throughout the world each day, including devices such as cellular phones, pagers, personal digital assistants (PDAs), and vehicle communication devices. Many of these devices use one or more types of communication channels, including voice and data channels, to provide a variety of services over wireless networks. Some devices utilize data encoding techniques to communicate both voice and data information over a voice channel, while other devices must use a data channel to send data information.

The short message service (SMS) provides communication of short text messages between different wireless communications devices, most commonly mobile phones. SMS messaging embodies a number of desirable attributes that have made it quite a popular form of communicating, including attributes pertaining to its speed and its privacy. Notwithstanding these positive characteristics, there are still instances where users of SMS messages can be subjected to the nefarious actions of third parties. Thus, it can be desirable to enhance certain security aspects of SMS messages.

SUMMARY OF THE INVENTION

According to an aspect of the invention, there is provided vehicle hardware, such as a telematics unit, that is used to authenticate an SMS message received in the vehicle. The vehicle hardware includes a processor and electronic memory that is accessible by the processor and that has stored thereon a program which is operable upon execution by the processor to carry out the steps of: (a) determining a vehicle key; (b) generating a security code using a mathematical function and the vehicle key; (c) producing an SMS message having information related to the security code; and (d) wirelessly sending the SMS message to a telematics-equipped vehicle, whereby the telematics-equipped vehicle can utilize the information related to the security code to authenticate the SMS message.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
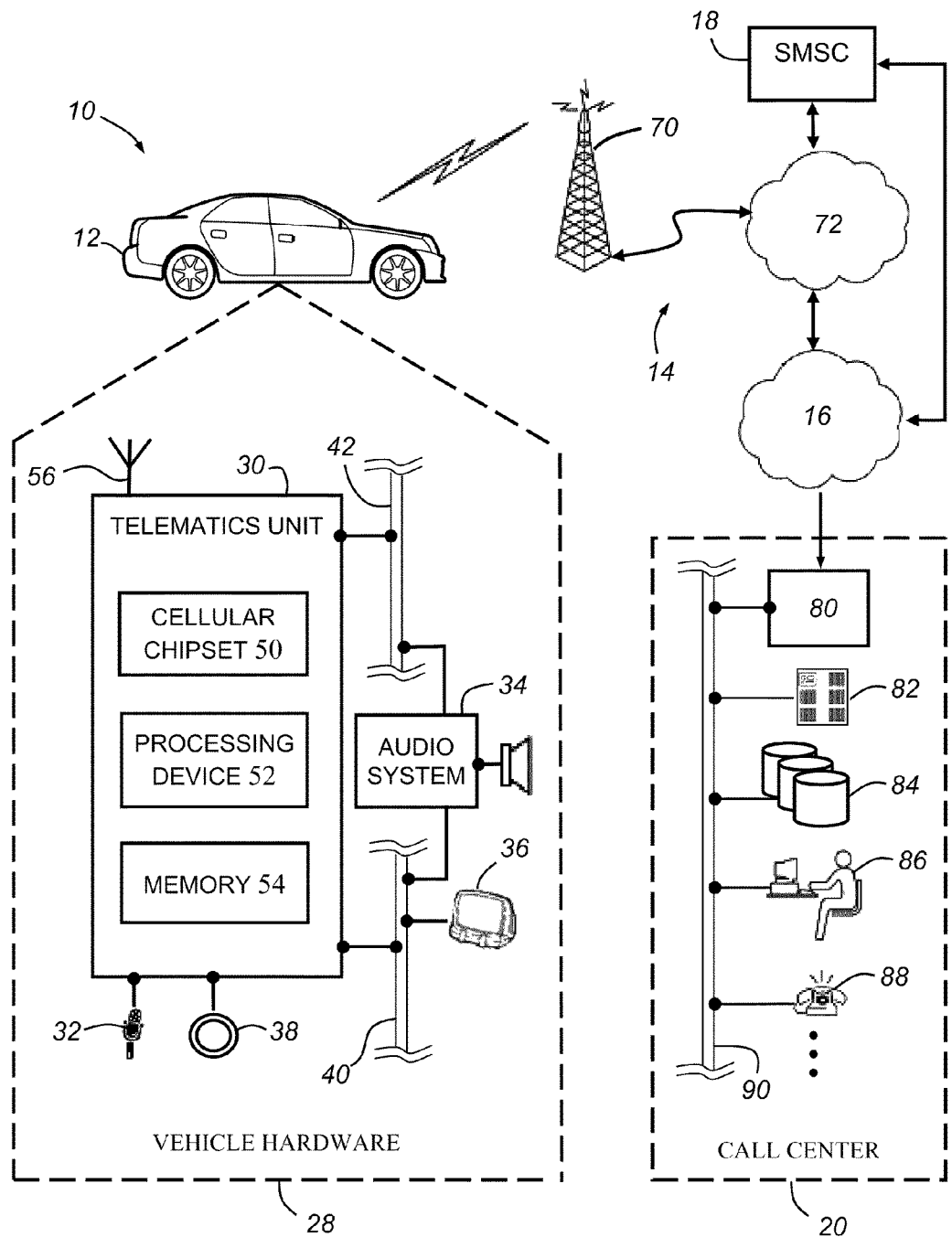
FIG. 1 is a block diagram depicting an exemplary embodiment of a communications system that is capable of utilizing the authentication method disclosed herein.
Figure 2:
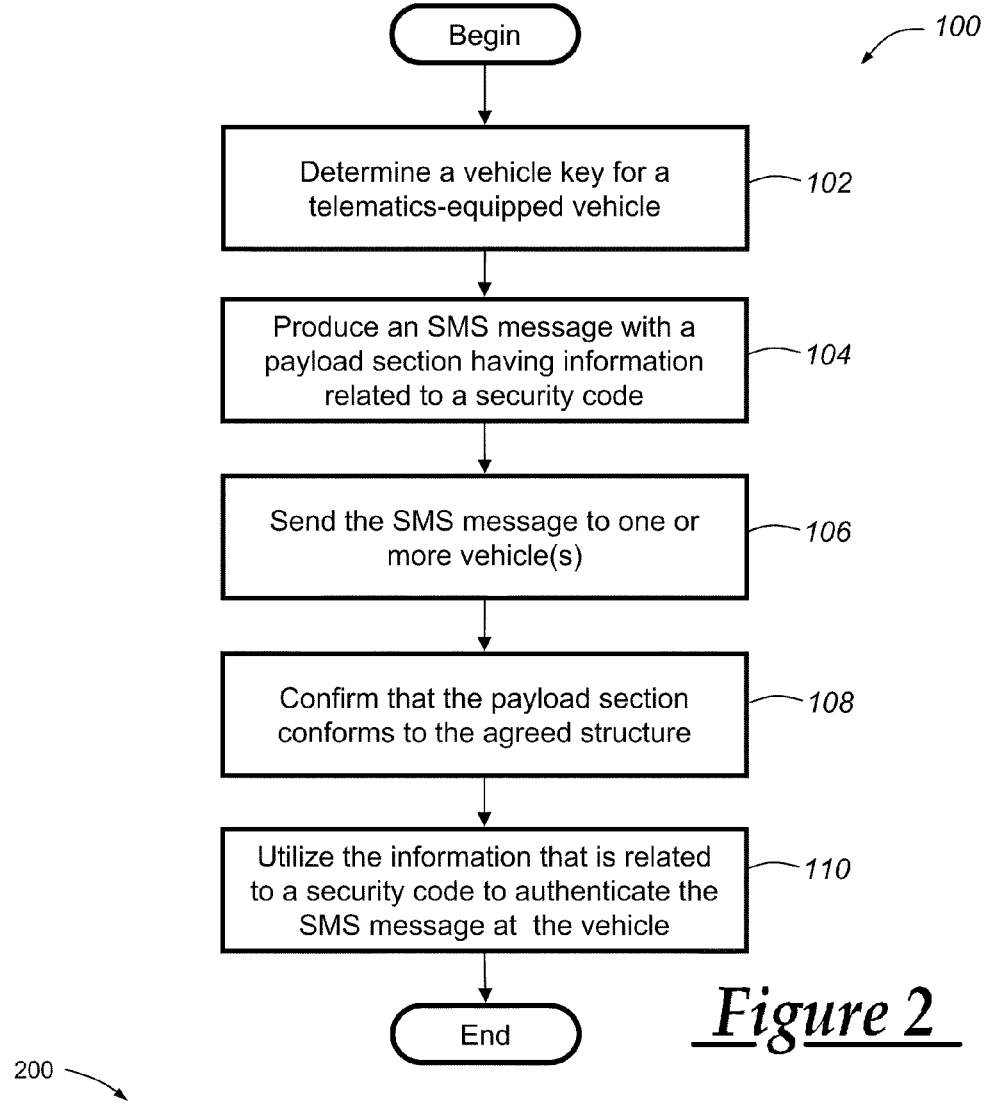
FIG. 2 is a flow chart depicting some of the steps of an embodiment of the authentication method.
Figure 4:
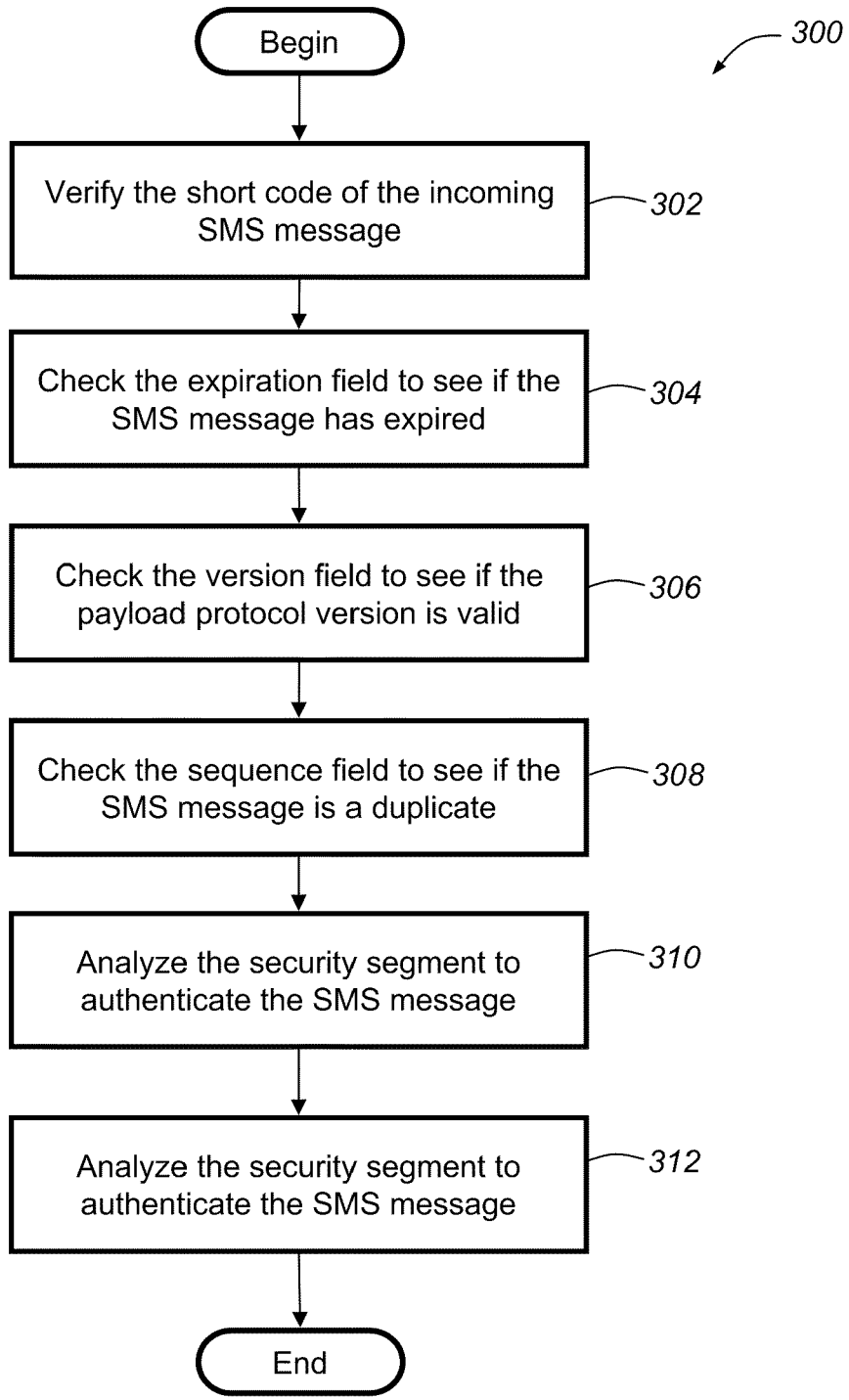
FIG. 4 is a flow chart depicting some of the steps of another embodiment of the authentication method, particularly, an embodiment where the authentication method is used as part of an authentication gateway.

The vehicle telematics unit described herein and shown in FIG. 1 can be used with the authentication methods of FIGS. 2 and 4 to receive and authenticate an incoming SMS message before it is conveyed to the user. Because SMS messaging lacks some of the features found in other forms of data messaging, such as those sent over an IP network, it can be desirable to provide additional security features above and beyond those inherent to the SMS protocol. For example, if a telematics-equipped vehicle is designed to receive and display SMS messages from an affiliated call center, then it can be desirable to ensure that an incoming SMS message is in fact from the call center and not some unauthorized third party. The disclosed authentication method can be used to help prevent or at least minimize the effects of nefarious activities on SMS messaging resources; these activities can include denial of service (DOS) attacks, spamming, spoofing, hacking, etc.

Communications System—

Beginning with FIG. 1, there is shown an exemplary operating environment that can be used to implement the authentication method disclosed herein. Communications system 10 generally includes a vehicle 12, a wireless carrier system 14, a communications network 16, a short message service center (SMSC) 18, and a call center 20. It should be understood that the authentication method can be used with any number of different systems and is not specifically limited to the examples shown here. Also, the overall architecture, setup, and operation, as well as the individual components, of a system such as that shown here are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle hardware 28 is shown generally in FIG. 1 and includes a telematics unit 30, a microphone 32, an audio system 34, a visual display 36, and an electronic button or control 38 that are interconnected using one or more network connections, such as a communications bus 40 or an entertainment bus 42. Examples of suitable network connections include a controller area network (CAN), a media oriented system transfer (MOST), a local interconnection network (LIN), an ethernet, a local area network (LAN), and other appropriate connections such as those that conform with known ISO, SAE and IEEE standards and specifications, to name but a few.

Telematics unit 30 preferably enables wireless voice and/or data communication over wireless carrier system 14 so that the vehicle can communicate with call center 20, other telematics-enabled vehicles, or some other entity. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, software updates, SMS messaging, etc. According to one embodiment, telematics unit 30 includes a standard cellular chipset 50 for voice communications like hands-free calling and for SMS messaging, a modem (not shown) for data transmission, an electronic processing device 52, one or more electronic memory devices 54, and a dual antenna 56. It should be appreciated that the modem can either be implemented through software that is stored in the telematics unit and is processed by an electronic processing device, or it can be a separate hardware component located internal or external to telematics unit 30. The modem can operate using any number of different standards or protocols such as EVDO, CDMA 1XRTT, GPRS, EDGE, WiMAX and HSDPA, to name but a few.

Electronic processing device 52 can be any type of suitable processing device capable of processing electronic instructions including, but certainly not limited to, microprocessors, microcontrollers, host processors, controllers, vehicle communication processors, and application specific integrated circuits (ASICs). Alternatively, the electronic processing device can work in conjunction with some type of central processing unit (CPU) or other component performing the function of a general purpose processor. Electronic processing device 52 executes various types of electronic instructions, such as software or firmware programs stored in electronic memory 54, which enable the telematics unit to provide a wide variety of services. For instance, electronic processing device 52 can execute programs or process data that enables the authentication method discussed herein.

Telematics unit 30 provides too many services to list them all, but several examples include: SMS and other messaging-related services, turn-by-turn directions and other navigation-related services that are provided in conjunction with a GPS-based vehicle navigation module (not shown); airbag deployment notification and other emergency or roadside assistance-related services that are provided in connection with one or more collision sensor interface modules such as a body control module (not shown); infotainment-related services where music, webpages, movies, television programs, videogames and/or other information is downloaded by an infotainment module (not shown) and is stored for current or later playback; and software updates where software, patches, service packs, etc. can be automatically or manually deployed and implemented so that the vehicle's software can be kept up-to-date. The above-listed services are by no means an exhaustive list of all of the capabilities of telematics unit 30, but are simply an illustration of some of the services that the telematics unit is capable of offering.

Vehicle hardware 28 also includes a number of vehicle user interfaces that provide vehicle occupants with a means of providing and/or receiving information, including microphone 32, audio system 34, visual display 36, and button 38. These devices allow a vehicle user to receive SMS messages, input commands, receive audio/visual feedback, and provide voice communications, to name but some of the possibilities. Microphone 32 provides an occupant with a means for inputting verbal or other auditory information, and can be connected to an automated voice processing unit utilizing human-machine interface (HMI) technology known in the art. Conversely, audio system 34 provides verbal output to a vehicle occupant and can be a dedicated, stand-alone system or part of the primary vehicle audio system. According to the particular embodiment shown here, audio system 34 is operatively coupled to both vehicle bus 40 and entertainment bus 42 and can provide AM, FM and satellite radio, CD, DVD and other multimedia functionality. This functionality can be provided in conjunction with or independent of the infotainment module described above. Visual display 36 is preferably a graphics display, such as a touch screen on the instrument panel or a heads-up display reflected off of the windshield, and can be used to provide a multitude of input and output functions like SMS messaging. Button 38 is an electronic pushbutton or other control that is typically used to initiate communication with call center 20 or some other service. Of course, numerous other vehicle user interfaces can also be utilized, as the aforementioned interfaces are only examples of some of the possibilities.

Wireless carrier system 14 is preferably a cellular telephone system but could be any other suitable wireless system, such as a satellite-based system, that is capable of transmitting signals between vehicle hardware 28 and call center 20. According to an exemplary embodiment, wireless carrier system 14 includes one or more cell towers 70, base stations and/or mobile switching centers (MSCs) 72, as well as any other networking components required to connect wireless carrier system 14 with land network 16. As is appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Land network 16 may be a conventional land-based telecommunications network that is connected to one or more landline telephones and connects wireless carrier system 14 to call center 20. For example, land network 16 may include a public switched telephone network (PSTN) and/or a TCP/IP network, as is appreciated by those skilled in the art. Of course, one or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Short message service center (SMSC) 18 is preferably in communication with wireless carrier system 14 and/or land network 16 and is involved in the communication of SMS messages. The SMSC typically operates according to a store-and-forward principal; that is, when a first user sends an SMS message that is intended for a second user, the SMS message gets stored at SMSC 18 until the second user is available to receive it. In some embodiments, if the SMSC is unable to reach the second user or recipient, then it queues the SMS message and tries again at a later time. In other embodiments, the SMSC employs a store-and-forget approach where it only attempts to pass the SMS message along one time. These types of approaches enable users to send and receive SMS messages at any time, even if they are currently on a voice call. It should of course be appreciated that the exemplary representation of SMSC 18 is but one example of a suitable arrangement, as the SMSC could instead be provided according to some other configuration known in the art. For instance, SMSC 18 could be integrated within wireless carrier system 14 and/or land network 16, instead of being schematically shown as a separate stand-alone component. Also, it is to be understood that multiple SMSCs may be utilized.

Call center 20 is designed to provide the vehicle hardware 28 with a number of different system back-end functions and, according to the exemplary embodiment shown here, generally includes one or more switches 80, servers 82, databases 84, live advisors 86, as well as a variety of other telecommunication and computer equipment 88 that is known in the art. These various call center components are preferably coupled to one another via a wired or wireless local area network 90. Switch 80, which can be a private branch exchange (PBX) switch, routes incoming signals so that voice transmissions are usually sent to either the live adviser 86 or an automated response system, and data transmissions are passed on to a modem or other piece of equipment 88 for demodulation and further signal processing. The modem preferably includes an encoder and can be connected to various devices such as a server 82 and database 84. Database 84 could be designed to store account information such as subscriber authentication information, vehicle identifiers, status information, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20, it will be appreciated that the call center can utilize an unmanned automated call response system and, in general, can be any central or remote facility, manned or unmanned, mobile or fixed, to or from which it is desirable to exchange voice and data transmissions.

Authentication Method—

Turning now to FIG. 2, there is shown some of the steps of an embodiment of authentication method 100 which enhances the security of SMS messages, particularly those being sent to and from telematics-equipped vehicles. Although the embodiment shown in FIG. 2 is specifically directed to a mobile-terminated SMS message that has an ASCII text payload and originates at call center 20 and terminates at telematics-equipped vehicle 12, it should be appreciated that the present authentication method could be used with other communications. Such communications can include point-to-multipoint or omnipoint communications, mobile-originated communications, SMS communications having binary or other types of payloads, vehicle-to-vehicle communications, call center-to-call center communications, and communications involving hand-held wireless devices or mobile phones, to name but a few.

Beginning with step 102, call center 20 determines a vehicle key for the telematics-equipped vehicle 12 that it is attempting to reach, where the vehicle key can include any combination of alpha-numeric characters or other data known to both the call center and the telematics-equipped vehicle. Preferably, the vehicle key is a confidential, multi-digit code that is not transmitted over the airwaves in an unsecured manner. It is possible to have a separate vehicle key for each vehicle, or to have a single vehicle key that is representative of a group of vehicles (for instance, all vehicles of the same make or model could have the same vehicle key). It is also possible for the vehicle key to be an unchangeable or permanent code maintained in the vehicle hardware 28 (similar to an electronic serial number (ESN)), or for it to be a changeable code that can be modified through software, etc. In the latter example, call center 20 could alter the vehicle key by securely sending telematics-equipped vehicle 12 an updated vehicle key on a periodic basis; such a communication could be performed on a wireless basis or on a wired basis when the vehicle is in for service.

In step 104, call center 20 constructs or otherwise produces an SMS message to send to one or more telematics-equipped vehicle(s) 12. An exemplary embodiment of this step is described in conjunction with FIG. 3, which is a schematic depiction of a payload section 200 of an exemplary SMS message containing ASCII text. It should be pointed out, however, that the present authentication method can be used with SMS messages other than those including ASCII text. For example, another embodiment is subsequently described that is directed to an SMS message having binary data in the payload instead of ASCII text. Those skilled in the art will also appreciate that a standard SMS message contains additional information, such as header information, etc. beyond that found in the payload section. Because this additional, non-payload information is generally known to skilled artisans, a detailed description here has been omitted. According to this particular embodiment, payload section 200 includes one hundred sixty, seven-digit ASCII characters (total of 1,120 bits) and has four main segments: a features segment 202, a security segment 204, a message segment 206, and a padding segment 208. It should be recognized that payload sections having differing configurations, lengths, protocols, etc. could also be used with the authentication method described herein.

Features segment 202 can include one or more single-character or multiple-character fields that can be used in connection with a variety of features. For instance, according to this particular embodiment, the first field (which is represented at character position '0') is a single-character version field 220 that generally identifies the protocol version being used. Because changes and improvements can be made to the protocol of payload section 200, it is helpful for the sender of the SMS message to alert the receiver as to which version of the payload protocol is being used; this way, the receiver can properly process the incoming message and detect instances where the message has out-of-bounds or invalid characters. In the example shown in FIG. 3, the protocol version is identified as version 'B'. Version field 220 is not the same as the actual SMS version (that information is typically included in a header section (not shown)); rather, it includes information on the protocol version that is used to govern payload section 200 and is related to the disclosed authentication method.

The next exemplary field shown in features segment 202 is a single-character sequence field 222 which is located at character position '1'. SMS messaging systems sometimes transmit duplicate messages to the same recipient because of network duplication, replay-type attacks, or some other cause. Sequence field 222 helps prevent duplicate messages from being displayed in telematics-equipped vehicle 12 by keeping a running log of messages and indicating as much in this field. For example, when call center 20 sends the very first SMS message to telematics-equipped vehicle 12 it could populate sequence field 222 with a '1' and increment a counter maintained at the call center. The next SMS message sent to that vehicle could be given a '2' in the sequence field and the counter would again be incremented; and so on. On the other side of the transmission, telematics-equipped vehicle 12 keeps track of the last several SMS messages displayed, so that if the last SMS message displayed had a '2' in the sequence field and a new incoming SMS message also had a '2', the vehicle would recognize this as a duplicate and would not display it to the user. Of course, the logic used at call center 20 and/or telematics-equipped vehicle 12 could employ a variety of techniques for keeping track of the sequence value and could use additional metrics when deciding whether or not to display an SMS message.

Priority field 224 is the next exemplary field shown in features segment 202 (occupies character position '2'), and is generally assigned by the sender to indicate the priority or importance of the SMS message. There are a number of situations, for example, where it is desirable to present the SMS message as soon as it is received by telematics-equipped vehicle 12; these situations can include warnings of local weather disasters, warnings of significant mechanical failures in the vehicle, etc. In such a case, the priority character field 224 could be given a priority value that indicates the urgency of the message so that the telematics-equipped vehicle knows to present the message as soon as it is received. It is possible to use a two-level or multiple-level priority scale, so long as both the call center and the vehicle use the same scale. In a two-level priority scale, an incoming SMS message with a low priority of '0' could be forwarded to an inbox for presentation at a later time, for example, when the vehicle is not in motion or is traveling slower than a predetermined speed. A high priority message, on the other hand, could be assigned a priority value of '1' so that it is immediately conveyed to the vehicle user via display 36, audio system 34 (message text is converted to audio message) and/or some other method or combination of methods.

Figure 3:
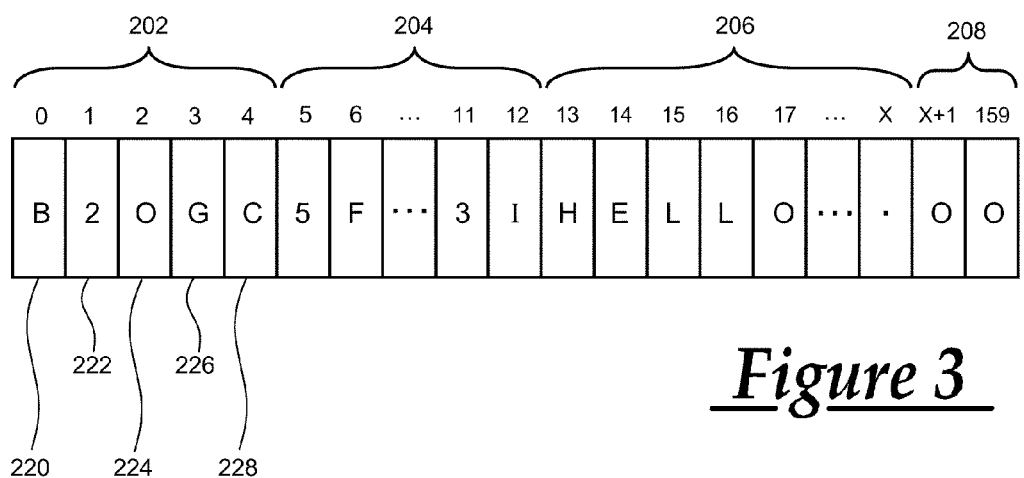
FIG. 3 is a schematic representation of a payload section of an SMS message that can be used with the authentication method.

Expiration field 226 is the next field in the exemplary features segment 202, and is designed to provide the SMS message with an expiration date or time-to-live (TTL) value. This field is particularly useful when it is used with messages that are only relevant for a certain amount of time. For instance, if call center 20 sends telematics-equipped vehicle 12 an SMS message alerting the vehicle user that extreme weather conditions are approaching, then this message is only applicable so long as the weather conditions continue to exist (if the user picked up the SMS message a week later, it would no longer be relevant). Thus, the expiration field 226 could include a time frame of, say, four hours; if the SMS message was not retrieved and viewed within four hours, then it would be deleted. Other types of messages, such as messages regarding account or billing status, may have an infinite expiration date so that they are saved indefinitely until the vehicle user retrieves them, even if that takes quite some time. Because this particular embodiment is directed to an SMS text message where the payload only includes ASCII values, some type of character mapping technique could be employed to convey the time and/or data information. In the example of FIG. 3, the expiration or time-to-live value has been mapped to the letter 'G'. This information can be expressed as an absolute temporal value or as a temporal value that is referenced to a certain point-in-time or time stamp. For instance, the letter G could indicate that the SMS message is valid for twenty-four hours from the time that it was sent by the call center (ie—the SMS origination time).

For implementations in which the SMS message is displayed visually, a display timer field 228 is used to instruct the telematics-equipped vehicle 12 how long to display the SMS message. Due to differences in the length and the nature of various SMS messages, it may be desirable to display them for different lengths of time. For example, SMS messages having a high priority (as discussed above), may be given a display timer value that is longer than other less-important messages. This field can also be helpful when the vehicle is displaying multiple SMS messages that are concatenated so that they appear as a single message to the vehicle user. The exemplary embodiment shown in FIG. 3 has the display timer field 228 assigned to character position '4' and is populated with the value 'C', which could instruct the telematics-equipped vehicle to display the SMS message for ten seconds, for example. The SMS message could also be displayed until cleared by some action of a vehicle occupant, such as by pressing a 'reset' or 'delete' button on a driver information console. A specific value for this can be used in the display timer field 228.

Although features segment 202 has exemplary fields 220-228, it should be appreciated that the features segment could have any combination of different fields, including fields that are known in the art but are not described here. An example of such a field is a random field where the sender of the SMS message randomly generates a value that is sent with the SMS message and varies each time according to no particular pattern. As previously mentioned, features segment 202 is specifically directed to an SMS message that uses ASCII text in the payload but it could be used with other forms of SMS messages, including those having binary messages.

Security segment 204 is included within the SMS message so that the authenticity of the message can be verified. Generally speaking, call center 20 applies a mathematical function to one or more inputs to derive a first security code, and then sends an SMS message to telematics-equipped vehicle 12 that includes information related to the first security code. The telematics-equipped vehicle uses the same mathematical function to separately determine a second security code, and then compares information related to the first security code with that related to the second security code. If the two security codes are equivalent (which they will be when the call center and vehicle use the same mathematical function and input), then the SMS message is deemed to be authentic. It should be appreciated that the security code could be represented in one of a variety of ways. For example, the security code could be conveyed in the SMS message exactly as it is computed (without any processing or modification), it could be processed and represented in some equivalent form (converting it from hex to ASCII), or it could be abbreviated or otherwise shortened so that it can transmit more easily. The preceding techniques demonstrate only a few of the possibilities for producing information related to a security code; others could be used as well. The following is a description of an exemplary mathematical function that can be used to generate the contents of security segment 204, however, other functions known in the art could also be used.

According to one embodiment, a hash function such as a keyed hash message authentication code (HMAC) is used to produce a security code, and the security code is then used to determine the contents of security segment 204. According to an exemplary embodiment, an iterative cryptographic hash function such as HAVAL, MD4, MD5, SHA-0, SHA-1 or SHA-256 is applied to a function input (in this case, the vehicle key and message segment 206 are combined to form the function input). Stated differently, the hash function takes the vehicle key and the actual message being transmitted (message segment 206), puts all of the characters together and applies an algorithm to the inputted string of characters so that a thirty-two digit hex number is produced; this is sometimes referred to as the digest. In this example, two different components (the vehicle key and the message segment) are concatenated or combined into a single input which is then processed by the hash function. It should be recognized that the function input could include a combination of components other than the vehicle key and the message segment; this includes combinations having more or less than two components. One such exemplary combination involves a function input having three components: a vehicle key, a random field, and an expiration field. If other types of mathematical functions are used (non-HMACs), it may not be necessary to combine or concatenate the function inputs; that is, the mathematical function may be capable of processing multiple inputs without combining them.

The security code is sometimes too large or cumbersome to include in security segment 204, so additional processing techniques can be used to reduce its size. For instance, the thirty-two digit hex number mentioned above could be further processed and shrunken down by taking a first string (say characters 1-8) and a second string (say characters 16-23), and applying an XOR function to the two strings. This produces an eight-digit hex number that, in the case of an ASCII text payload, can be represented in ASCII format in security segment 204 (characters positions '5'-'12'). This eight-digit ASCII code is an example of information that is related to the security code, as the security code was used in its derivation.

Turning now to the next part of payload section 200, message segment 206 is the part of the SMS message that generally contains the actual message being conveyed. The message is generally entered and transmitted according to standard SMS techniques, and thus does not need to be described in detail here. It should be noted, however, because features segment 202 and security segment 204 have used some of the one hundred sixty available seven-digit ASCII characters of payload section 200, the number of characters available for message segment 206 is reduced. According to the embodiment of FIG. 3, message segment 206 occupies character positions '13'-'x', where x is dependent on the length of the text message.

Padding segment 208 preferably follows message segment 206, and includes one or more filler characters that cause the payload section to use its full allotment of ASCII characters. The practice is somewhat similar to 'fill-zeros' that are oftentimes used in front of a string so that the string has a predetermined number of digits. Padding segment 208 causes the payload section to have as many characters as is allowed by the SMS protocol. In turn, this causes various network components like SMSC 18 or base stations/mobile switching center (MSC) 72 to put the SMS message on a traffic channel instead of a paging channel. If the SMS message did not include padding segment 208 and message segment 206 was significantly shorter than the one hundred sixty allotted ASCII characters (i.e.—text message simply says "hi"), then the overall SMS message could be small enough that a network component would try to transmit it on a paging channel, which is somewhat less secure than a traffic channel. This situation is avoided by use of padding segment 208, which in this case uses '0s' for the filler characters. Other filler characters could also be used, but they should be ASCII characters to avoid being removed by SMS text gateways. It is also preferable that the filler characters be recognizable as filler characters so that they are not considered part of the function input and are not presented to the vehicle user.

Once payload section 200 is completed, any other required portions of the SMS message, like a header section, can be created and attached to the SMS message according to conventional SMS messaging techniques.

Referring back to the flowchart in FIG. 2, now that the SMS message has been created it is wirelessly sent from call center 20 to one or more telematics-equipped vehicles 12, step 106. Transmission of the SMS message is likely to proceed through land network 16, SMSC 18, wireless communications system 14, or some combination thereof. Because methods for sending and routing SMS messages are known in the art, a detailed description is not provided here. Once the SMS message is successfully received at telematics-equipped vehicle 12, one or more pieces of vehicle hardware 28, like telematics unit 30, authenticate the message by using techniques similar to those previously described. More specifically, payload section 200 is examined to make sure that it conforms to the agreed upon protocol or structure, step 108. For instance, if the call center and vehicle have agreed upon a features segment structure having five single-character fields, such as that shown in FIG. 3, and the incoming message has four fields, or multi-character fields, or fields with invalid or out-of-bounds values, then the message is considered unauthenticated.

Assuming that features segment 202 conforms with the specified structure or protocol, step 110 combines the vehicle key and the contents of transmitted message segment 206 and applies a mathematical function to the concatenated string, as already explained. If vehicle hardware 28 uses the same mathematical function and the same function inputs, it will derive the same information as conveyed in security segment 204. As will be appreciated by those skilled in the art, step 110 authenticates the SMS message by appropriately comparing information derived in step 104 by the call center with information derived in step 110 by the telematics-equipped vehicle, regardless of the specific form of the information.

According to another embodiment, the authentication method is performed on a binary SMS message; that is, an SMS message where the contents of the payload section are in a binary format. The authentication method is largely the same as that described above, however, there are some differences due to the binary nature of the information. For instance, the payload section includes one hundred forty, eight-bit bytes of information, as opposed to one hundred sixty, seven-bit ASCII characters. Another difference is that the values in the expiration field can be expressed as an actual temporal value and do not need to be mapped, as in the preceding ASCII embodiment. Those skilled in the art will appreciate that there a number of practical differences between SMS messages with different types of payload content, and will know how to apply the present authentication method to these different types.

In addition to the methods described above, the present authentication method could also utilize other techniques for authenticating or verifying the validity of an SMS message. One such example involves the use of short codes and/or originating addresses. In the header section of the SMS message, there is a short code and/or an originating address that identifies the party that sent the SMS message. Authentication method 100 could compare the short code to a list of authorized originators in step 108 and, if it is not on the list, then consider the SMS message to be from an unauthorized source. The list of authorized originators could be provided over-the-air as a configuration table or as some other type of data structure.

Furthermore, it is possible to use the authentication method described herein with one or more encryption/decryption techniques known in the art. In such a scenario, the authentication method could act as an initial authentication gate or filter that the SMS message must pass through before being decrypted. Not only does this approach augment the security features of the SMS messaging system, it also saves valuable network resources by avoiding unnecessary decryption of unauthenticated messages; a process that can be quite time and resource intensive. As an additional security step, an initialization vector (IV) can be interleaved through payload section 200.

According to the embodiment shown in FIG. 4, telematics-equipped vehicle 12 uses the sequence of steps 300 as an authentication gate before decrypting the contents of the payload section. First, it verifies the short code and/or originating address of the incoming SMS message, step 302. If it recognizes the short code and/or originating address, then authentication continues to the next step; if it is not recognized, then the SMS message is considered unauthenticated and is deleted. Next, the telematics-equipped vehicle checks to see if the time specified in the expiration field 226 has expired, step 304. If it has not, then authentication proceeds to the next step; if it has expired, then the SMS message is deleted. In step 306, the authentication method determines if the payload protocol version (contained in version field 220) is valid. If so, then authentication continues; if not, the SMS message is deemed invalid and is deleted. Next, the sequence field 222 is checked to be sure that the SMS message is not a duplicate, step 308. If the SMS is not determined to be duplicative, then the authentication method continues; if it is a duplicate, then the SMS message is deleted. Only when the SMS message has passed the aforementioned steps is the security segment analyzed for authentication, step 310. This sequence enables the telematics-equipped vehicle to delete a number of unauthorized SMS messages without expending valuable processing time and resources determining the authenticity of security segment 204. Likewise, the message segment 206 is only decrypted, step 312, once the security segment has been authenticated; again, this saves resources by not decrypting messages that do not pass authentication.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. Vehicle hardware for authenticating an SMS message received in a vehicle, comprising a processor and electronic memory that is accessible by the processor and that has stored thereon a program which is operable upon execution by the processor to carry out the steps of:
   (a) determining a vehicle key for the vehicle telematics unit;
   (b) wirelessly receiving an SMS message at the telematics unit, wherein the SMS message includes a payload section having information related to a security code;
   (c) generating a security code using a mathematical function and the vehicle key; and
   (d) comparing the payload section information received in step (b) with the security code generated in step (c) to authenticate the SMS message;
   wherein the mathematical function utilizes a keyed-hash message authentication code (HMAC).

2. Vehicle hardware as defined in claim 1, wherein the HMAC includes at least one function selected from the group consisting of: HAVAL, MD4, MD5, SHA-0, SHA-1 or SHA-256.

3. Vehicle hardware as defined in claim 1, wherein step (c) further includes generating the security code using the mathematical function, the vehicle key, and one or more additional component(s) that are located in the payload section and are wirelessly received with the SMS message.

4. Vehicle hardware as defined in claim 3, wherein the one or more additional component(s) includes a component that is related to a message segment.

5. Vehicle hardware as defined in claim 3, wherein the one or more additional component(s) includes a component that is related to a features segment field.

6. Vehicle hardware as defined in claim 5, wherein the features segment field is selected from the group consisting of: a version field, a sequence field, a priority field, an expiration field, a display timer field, and a random field.

7. Vehicle hardware as defined in claim 5, wherein the one or more additional component(s) includes a first component that is related to a random field, and a second component that is related to an expiration field.

8. Vehicle hardware as defined in claim 1, wherein the payload section further includes a features segment, a message segment, and a padding segment.

9. Vehicle hardware as defined in claim 8, wherein the features segment includes at least one field selected from the list consisting of: a version field, a sequence field, a priority field, an expiration field, a display timer field, and a random field.

10. Vehicle hardware as defined in claim 8, wherein the padding segment includes one or more filler characters that: i) cause the payload section to fully use its allotment of characters, ii) are recognizable as filler characters, and iii) are not used in step (c) to generate the security code.

11. Vehicle hardware as defined in claim 1, wherein the payload section consists of a plurality of seven-bit ASCII characters.

12. Vehicle hardware as defined in claim 1, wherein the payload section consists of a plurality of eight-bit binary bytes.

13. Vehicle hardware as defined in claim 1, wherein steps (a) through (d) operate as an initial authentication gate; and wherein if the SMS message passes the authentication gate then a subsequent decryption method is applied by the telematics unit to the SMS message, and if the SMS message does not pass the authentication gate then the SMS message is deleted.

14. Vehicle hardware as defined in claim 1, further comprising a telematics unit that includes the processor and electronic memory.

* * * * *